United States Patent [19]
Tate

[11] 3,924,684
[45] Dec. 9, 1975

[54] METHOD FOR STIMULATING WELL PRODUCTION

[75] Inventor: Jack F. Tate, Houston, Tex.

[73] Assignee: Texaco Inc., New York, N.Y.

[22] Filed: Dec. 20, 1973

[21] Appl. No.: 426,998

[52] U.S. Cl. .................................. 166/307; 166/308
[51] Int. Cl.² .................... E21B 43/27; E21B 43/26
[58] Field of Search ........... 166/307, 308, 283, 282, 166/281; 252/8.55 C

[56] References Cited
UNITED STATES PATENTS

| | | | |
|---|---|---|---|
| 2,367,350 | 1/1945 | Heigl | 166/307 |
| 2,885,004 | 5/1959 | Perry | 166/307 |
| 3,294,765 | 12/1966 | Hort et al. | 166/307 UX |
| 3,791,446 | 2/1974 | Tate | 166/307 |
| 3,794,117 | 2/1974 | Knox et al. | 166/307 |

*Primary Examiner*—Stephen J. Novosad
*Attorney, Agent, or Firm*—T. H. Whaley; C. G. Ries; Walter D. Hunter

[57] ABSTRACT

The production of hydrocarbons from a subterranean hydrocarbon-bearing formation containing acid-soluble components, such as one containing clays or siliceous minerals as exemplified by sandstone, shale, etc. is stimulated by injecting into the formation a composition comprising an aqueous solution of a mineral acid and a fluorine-containing acid or salt and having dissolved therein a vinylpyrrolidone polymer. The in-depth increase in the permeability and porosity of the formation achieved utilizing the method of invention results in a substantial improvement in hydrocarbon recovery.

12 Claims, 2 Drawing Figures

INCREASE IN PERMEABILITY OF BEREA SANDSTONE CORE BY MUD ACID VS RETARDED MUD ACID (1% PVP)

○ 6% HF - 12% HCl - 1% PVP
+ 6% HF - 12% HCl
I DISTILLED WATER
II 3M HCl
III 6% HF - 12% HCl OR 6% HF - 12% HCl - 1% PVP

Fig. 1

INCREASE IN PERMEABILITY OF BEREA SANDSTONE CORE BY MUD ACID VS RETARDED MUD ACID (1% PVP)

- ○ 6% HF - 12% HCl - 1% PVP
- + 6% HF - 12% HCl
- I DISTILLED WATER
- II 3M HCl
- III 6% HF - 12% HCl OR 6% HF - 12% HCl - 1% PVP $K_w$ (md)

REACTION RATE DATA FOR
GLASS SLIDE ETCHING TESTS

METHOD FOR STIMULATING WELL PRODUCTION

FIELD OF THE INVENTION

This invention relates to a method for stimulating the production of fluids from earthen formations. More particularly, this invention relates to a method in which the permeability and porosity of a hydrocarbon-bearing formation containing sandstone and clay components are improved on treatment of the formation with an aqueous solution of a mineral acid such as hydrochloric acid and a fluorine-containing acid or salt and having dissolved therein a vinylpyrrolidone polymer.

DESCRIPTION OF THE PRIOR ART

The technique of increasing the permeability of a subterranean hydrocarbon-bearing formation for the purpose of stimulating the production of fluids therefrom has long been practiced in the art. One such method commonly employed is known as acidizing which is widely utilized in treating subsurface geological formation, e.g., sandstone, limestone, dolomite, etc. In the usual well-acidizing procedure, a non-oxidizing mineral acid or mixture of acids such as hydrochloric and hydrofluroic is introduced into the well and under sufficient pressure is forced into the adjacent subterranean formation where it reacts with acid-reactive components, i.e., the siliceous materials, the carbonates, etc.

During the process passageways for fluid flow are created or existing passageways therein are enlarged thus stimulating the production of oil water, brines and various gases. If desired, the acidization may be carried out at an injection pressure sufficiently great to create fractures in the strata or formation which has the desired advantage of opening up passageways into the formation along which the acid can travel to more remote areas from the well bore. The salts formed are extensively water soluble and are readily removed by reverse flow from the formation via the well bore.

There are, however, disadvantages attending the use of hydrochloric acid or other similar non-oxidizing mineral acids. For example, these strong aqueous acids have almost instantaneous rates of reaction with the acid-reactive components contained in the formation. The acid, therefore, necessarily spends itself in the formation immediately adjacent the well bore so little beneficial effect is realized at any great distance from the well bore within the formation under treatment. These strong aqueous acids also may cause channeling, cavitation and eventual collapse of the formation immediately adjacent the well bore due to excessively rapid action of the acid. In addition, subsurface equipment may be damaged severely by strong acid attack.

Treatment of sandstone formations by mixed hydrochlorichydrofluoric acids has been used in the past as a means of removing damage caused by the presence of clays either originally present in the formation or introduced into the formation during drilling operations. The removal of such clays is accomplished by dissolution by reaction with the hydrofluoric acid:

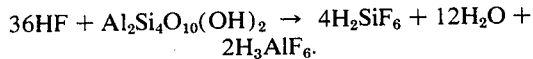

Furthermore, the hydrofluoric acid component of the mixed acid will react with the sand and other siliceous minerals according to the following equation:

The dissolution of both clays and siliceous material can materially increase the permeability and porosity of the formation in the vicinity of the wellbore and hence the production rate of the well. Although treatment of the formation in the vicinity of the injection wellbore usually results in an increase in the flow capabilities of the individual well under treatment, the response in production improvement may be only temporary.

It has been widely assumed that these mixed acid systems could be injected into a sandstone formation to dissolve clay at almost any depth from the wellbore, and that their reaction upon silica surfaces is so slow that little reaction takes place. A recent study (J. Pet. Tech., Vol. XXII, June 1970, p. 693) has shown that the reaction rate of mixed HCl-HF on clays is virtually instantaneous. Since clay is the mineral that usually causes most of the damage in sandstone formations, retarding the reaction rate of the acid mixture toward both sandstones and clays would be greatly beneficial. There are two types of mud damage: (1) Completion damage, which results from drilling mud permeating the pore spaces of the formation adjacent to the wellbore which is generally limited to a zone extending about one inch from the wellbore, and (2) Natural damage, which results from a reduction in virgin permeability as a result of swelling or migration of sensitive clays which may cause plugging of the formation flow channels. Natural damage is usually thought to exist to a depth of 2 or 3 feet from the wellbore. However, it can extend 7 or 8 feet from the wellbore. One can see that when treating formations with natural clay damge, the production increase realized is dependent upon the distance which the hydrofluoric acid can be pumped into the formation before being spent. Furthermore, as the depth of damage increases the need for an acid mixture which will attack the formation at a greater distance from the wellbore becomes more desirable.

One method suggested to overcome the above-mentioned disadvantage of the fast reaction of the acid solution in the vicinity of the wellbore has been the use of "retarded" acids which consist, for example, of mineral acids and an additive which emulsifies the acid, a combination of which affects the acidization rate. Although such emulsified mixtures can be displaced into the formation before substantial reaction occurs, such compositions have the inherent disadvantage in that when the emulsion breaks and they do react, they usually react swiftly, often unpredictably with the result that problems of cavitation and channeling develop. More importantly, the use of such emulsified retarded acid has been limited to conventional acidization processes using hydrochloric acid alone, which has no utility in the dissolution of silica or clays.

The use of cross-linked copolymers of polyvinylpyrrolidone and polyacrylamides, polyurethanes, etc. to give materials which are insoluble in aqueous mineral acid solutions is described in U.S. Pat. No. 3,380,529 to Hendrickson. Such insoluble, cross-linked polymers are utilized as agents for partially plugging channels developed during acidization treatment in order to effect acidic attack at greater distances from the wellbore. In U.S. Pat. No. 3,434,971 a similar acidization process is described in which a copolymer prepared by polymerizing acrylamide and N-vinylpyrrolidone in the presence of a cross-linking agent, such as N,N'- methylenebisacrylamide, is disclosed. These copolymers are insoluble in the aqueous mineral acid solutions employed in acidization operations and are utilized as dispersions in the acid solutions. Both of the previously mentioned acidization processes which utilize insoluble, cross-linked copolymers are distinctly different from the novel method of this invention in which a vinyl-pyrrolidone polymer soluble in aqueous mineral acid solutions is used.

It is therefore, the principal object of the present invention to overcome the defects of the prior art in acidizing fluid-bearing formations such as hydrocarbon-bearing formations, etc., by providing a method utilizing the novel acidizing composition of this invention in which the distance to which the acidizing composition penetrates the formation before becoming spent is extended, thus providing in-depth acidization.

Another object of this invention is to provide a method of acidization employing the novel composition of this invention which is effective in sandstone and clay-containing formations.

Another object of this invention is to provide a high viscosity acidizing fluid containing in solution a vinyl-pyrrolidone polymer which is stable over long periods of time in which the polymer constituent does not hydrolyze or otherwise decompose on storage thus avoiding the simultaneous reduction in viscosity and effectiveness in acidization-in-depth operations.

SUMMARY OF THE INVENTION

This invention encompasses and includes a method of increasing the production of fluids from a subterranean fluid-bearing formation having present sandstone and clay components, comprising injecting down the wellbore penetrating said formation and injecting therefrom into said formation under a pressure greater than formation pressure an aqueous acidizing composition, maintaining said composition in contact with the formation strata for a time sufficient for the acid to chemically react with the acid-soluble components of the formation to etch or enlarge passageways therethrough thereby increasing substantially the flow capacity of the said subterranean formation.

The novel acidizing composition of this invention comprises an aqueous solution of an acid selected from the group consisting of hydrochloric and sulfuric acid and a fluorine-containing acid or salt and having dissolved therein a vinylpyrrolidone polymer. The amount of acid present in the subject composition is such that it is capable of reacting with acid soluble components of the fluid-bearing strata.

A number of advantages result in employing the novel composition of this invention in acidizing sandstone and clay containing fluid-bearing formation, namely:

1. The reaction rate of the acid with the formation acid-solubles, such as the sandstone and clays, etc., is greatly lessened. As previously pointed out one of the most serious problems encountered in the use of mineral acids as acidizing agents is the very rapid rate with which the known acidizing compositions react with such acid-solubles so that little actual effect takes place at any great distance from the well.

2. The viscosity of the acidizing fluid is increased. Such a viscosity increase is characteristic of fluid-loss agents often use in acidizing formulations to cause more uniform formation penetration and minimize leakage into zones of higher permeability or into natural fractures.

3. The cited polymer is highly effective in preventing swelling of water-sensitive clays or shales and thus formation damage of this type during acidization is largely avoided.

4. If acid-fracturing is conducted using sand as a propping agent, and the sand is pumped in the acid, less dissolution of propping agent will occur. Thus more acid will remain to react with the formation and less prop sand will be sacrificed.

BRIEF DESCRIPTION OF THE DRAWINGS

FIG. 1 graphically depicts the increase in permeability to water of Berea Sandstone cores by mud acid versus the retarded acid of the present invention.

DETAILED DESCRIPTION OF THE INVENTION

Figure 2:
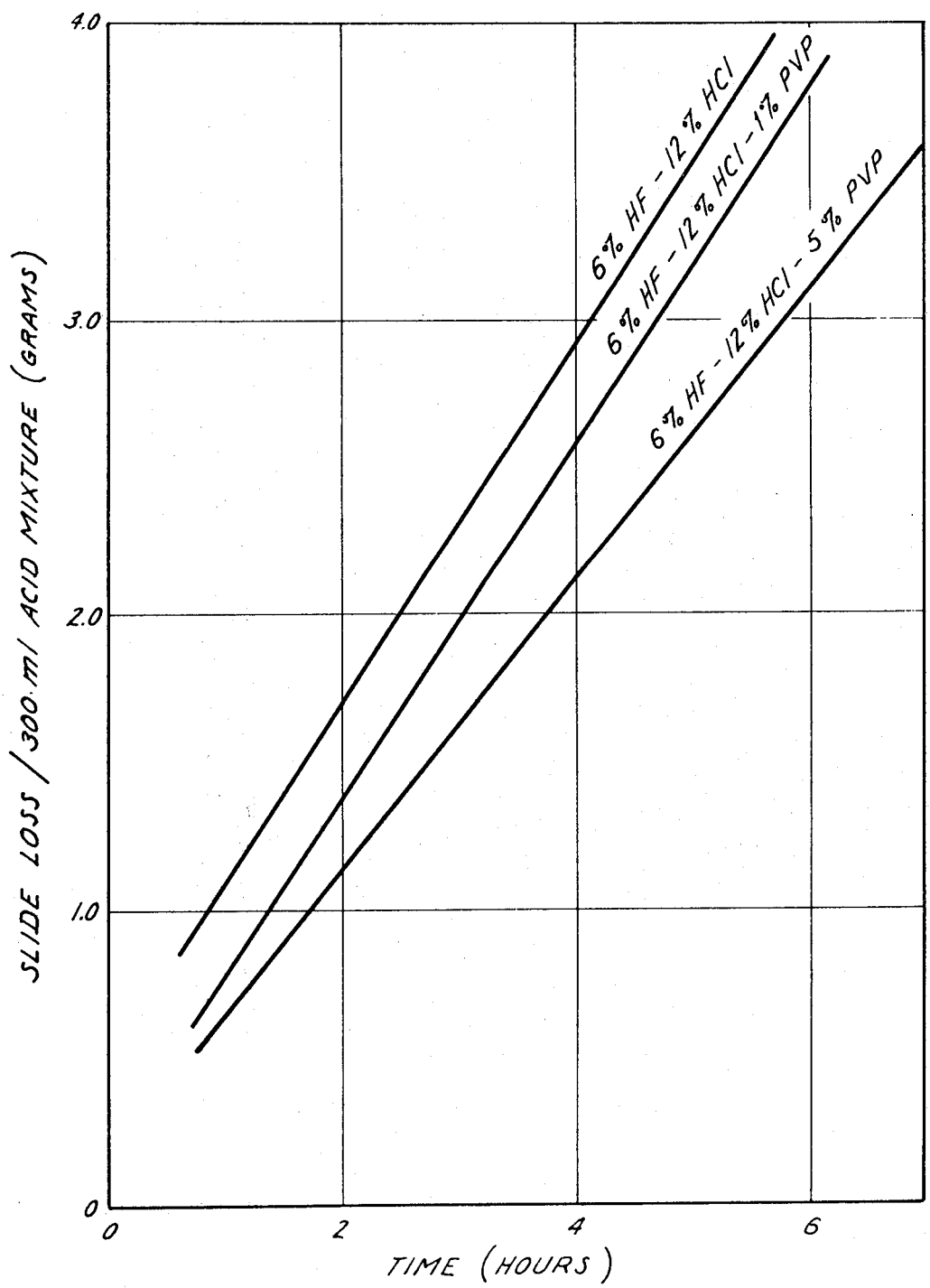
FIG. 2 graphically depicts the respective reaction rates of polyvinylpyrrolidone-retarded acid versus ininigibited acid in glass slide etching test.

In its broadest embodiment the method of the present invention comprises introducing into a subsurface sandstone and clay-containing formation an acid solution of a water-soluble vinylpyrrolidone polymer wherein the said solution is maintained in contact with the formation for a time sufficient to chemically react with the formation so as to increase substantially the flow capabilities of the formation.

The average molecular weight of the vinylpyrrolidone polymers utilized in the method of this invention generally will be from about 10,000 to about 1,000,000 or more and preferably will be from about 100,000 to about 400,000.

Highly advantageous results are realized with the method of this invention when water-soluble vinylpyrrolidone polymers having recurring units of the formula:

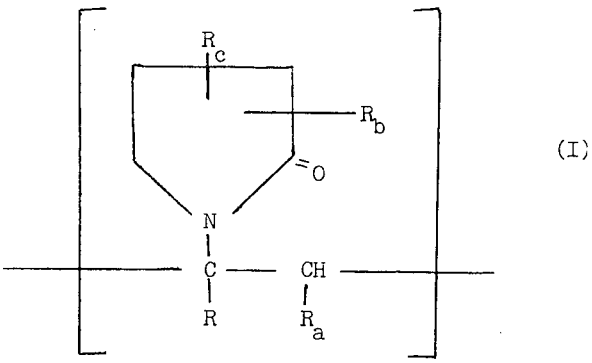

(I)

wherein R, $R_a$, $R_b$ and $R_c$ are independently selected from the group consisting of hydrogen and alkyl radicals having from 1 to 5 inclusive carbon atoms are employed. Useful alkyl radicals of 1 to 5 inclusive carbon atoms include methyl, ethyl, propyl, butyl, pentyl, and isomeric forms thereof. The sole limitation on the cited structure is that it be sufficiently soluble in the aqueous acid. When R, $R_a$, $R_b$ and $R_c$ of Formula I above are each hydrogen, the resulting compound is polyvinylpyrrolidone, i.e., poly-N-vinyl-2-pyrrolidone which is an especially useful polymer.

Preferably, the acid aqueous treating composition of this invention injected into the hydrocarbon-bearing formation comprises an aqueous solution of about 5 to about 12 percent by weight of a mineral acid selected from the group consisting of hydrochloric and sulfuric from about 3 to about 7 percent by weight of hydrofluoric acid and which contains dissolved therein between about 0.5 to about 5 percent by weight based on the total solution weight of the water-soluble vinylpyrrolidone polymer.

The vinylpyrrolidone polymers employed show a high degree fo compatibility (i.e., no reaction) with inorganic salt solutions of compounds such as magnesium chloride, calcium chloride; barium chloride, sodium chloride, etc. As expected, the intrinsic viscosity increases with concentration and molecular weight (degree of polymerization). One of the unique characteristics of the cited polymer lies in the large increase in viscosity in aqueous acidic solutions thereof as the acidity is increased.

In preparing the vinylpyrrolidone polymers employed in the novel treating compositions of this invention, a carboxylic acid amide of the formula:

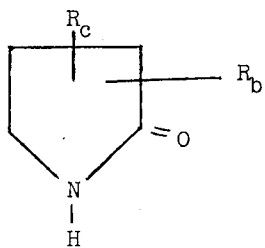

such as 2-pyrrolidone, 3-methyl-2-pyrrolidone, 4,4diethyl 2-pyrrolidone, 5-isobutyl-2-pyrrolidone, 4-methyl-2-pyrrolidone, 3-ethyl-2-pyrrolidone, 3-methy-5-ethyl-2-pyrrolidone, etc., is reacted with the acetylene or an acetylenic derivative of the formula:

$$RC \equiv CR_a$$

where $R$ and $R_a$ have the same meaning as previously described under pressure at temperatures from about 130° to about 160°C and in the presence of the alkali metal salts of these acetylenic compounds as catalysts. This method is set forth in Kirk-Othmer, *Encyclopedia of Chemical Technology*, Second Edition, Vol. I, Interscience Publishers New York, 1963, page 204. The polymerization of the resulting vinyl derivatives can be carried out by methods well known in the art. The vinylpyrrolidone polymers are also sometimes referred to as polyethenylpyrrolidinones.

The acid polymer solutions employed in the process of this invention, preferably contain an inhibitor to prevent or greatly reduce corrosion attack on metals. A variety of such inhibitors are known in the art, e.g., certain compounds of arsenic, nitrogen or sulfur as described by Grebe et al. in U.S. Pat. No. 1,877,504. Likewise, rosin-amine type inhibitors, as illustrated in U.S. Pat. No. 2,758,970 may be utilized. A small but effective amount of the inhibitor is employed which generally ranges from about 0.02 to about 1.5 percent by weight of the acidic aqueous polymer solution.

In carrying out the method of this invention a solution of from about 5 to about 12 percent by weight of a mineral acid such as hydrochloric acid dissolved in fresh water is first prepared after which sufficient hydrofluoric acid is added to form a solution having about 3 to about 7 percent by weight of hydrofluoric acid. An inhibitor to prevent corrosion of acid on the metal equipment associated with the well is usually added with mixing in the next step. The vinylpyrrolisone polymer in an amount within the stated concentration range is then admixed with the aqueous acid solution employing a blender. If the formation contains calcareous material a pre-flush of hydrochloric acid having a concentration of about 1 to about 5 weight percent may be forced through the producing formation to prevent the precipitation of $CaF_2$ formed by reaction of hydrofluoric acid on calcium carbonate. If the connate water of the formation is hard, but little limestone present, a pre-flush with fresh water will suffice. The polymer dissolves rather rapidly in the acid solution and the thus-prepared composition is force, usually via a suitable pumping system, down the wellbore and into contact with the formation to be treated. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution. Generally, it is advisable to allow the aqueous acidic polymer solution to remain in contact with the formation until the acid therein has been substantially depleted by reaction with the acid-soluble components of the formation. After this, the substantially spent treating solution is reversed out of the well, i.e., it is allowed to flow back out or to be pumped out of the formation. Further, as those skilled in the art will understand, the concentration of the polymer and acid should be chosen to provide an acidizing fluid of the desired rheological properties. Similarly, the appropriate molecular weight polymer is selected on this same basis.

In another embodiment of this invention the acidic aqueous polymer solution is formed by adding to an aqueous solution of about 10 to about 18 weight percent of a mineral acid selected from the group consisting of hydrochloric and sulfuric acid and having dissolved therein from about 0.5 to about 5.0 percent by weight of a vinyl-pyrrolidone polymer from about 2.5 to about 10 percent by weight of a fluorine-containing acid salt selected from the group consisting of (A) fluoride salts such as ammonium fluoride and lithium fluoride as well as (B) acid fluorides as exemplified by ammonium acid fluoride ($NH_4HF_2$) and lithium acid fluoride ($LiHF_2$). The fluorine-containing salt when added to the solution of the mineral acid reacts to form hydrogen fluoride and the corresponding ammonium, or lithium chloride or sulfate. It has been found that a highly beneficial effect is achieved when the acidic aqueous polymer solution employed in the secondary recovery process of this invention contains, in addition to the mineral acid, hydrofluoric acid, and a polyvinylpyrrolidone, the ammonium or lithium ions derived from one or more of the fluorine-containing salts.

In order to promote effective acidization of the formation with the hydrofluoric acid at a considerable distance from the bore hole, the introduction of the acidic aqueous polymer solution into the formation can be preceded by the injecting into the formation via the injection well a slug of an aqueous solution containing from about 2.5 to about 10 weight percent of a fluorine-containing acid salt selected from the group consisting of (A) fluorides such as ammonium, ammonium acid fluoride or lithium fluoride and (B) the corresponding acid fluorides. Since these fluoride salts are not reactive to any extent with the sandstone and clay components of the formation it is possible to pressure inject solutions of these salts for a considerable distance into the formation. Following the injection of the aqueous fluoride salt solution there is injected into the formation a slug of an acidic aqueous polymer solution of the type previously described comprising from about 5 to about 12 percent by weight of a mineral acid selected from the group consisting of hydrochloric and sulfuric acid, from about 3 to about 7 percent by weight of hydrofluoric acid and which contains dissolved therein between about 0.5 to about 5 percent by weight of the water-soluble vinylpyrrolidone polymer. By using this technique the hydrofluoric acid content of the acidic aqueous solution is restrengthened by reaction of the initially injected fluoride salts with the excess hydrochloric acid in the second solution enhancing and augmenting attack upon thee sand and clays in the formation at considerable distance from the wellbore.

A series of experiments have been performed to evaluate the effectiveness of the disclosed acidic aqueous polymer solutions in retarding the reaction rate of siliceous material and formation clays. Aqueous mixtures of hydrofluoric and hydrochloric acids having polyvinylpyrrolidone dissolved therein were utilized in these experimental runs.

A. Preparation of Mixed Acid Solutions

The retarded acid systems tested were mixtures of hydrofluoric and hydrochloric acid containing dissolved polyvinylpyrrolidone (M.W. 360,000). These solutions were prepared by adding the appropriate weight of solid polyvinylpyrrolidone slowly with stirring to a solution of 6 percent by weight of hydrogen fluoride and 12 percent by weight of hydrochloric acid and stirring the mixture until the solid polymer had dissolved and a clear solution obtained.

B. Permeability Measurements

Permeability studies were made using Berea Sandstone which contained several weight percent clay. Cylindrical cores, measuring 2.20 cm. in both length and diameter were extracted for 24 hours with a mixture of 50 percent (V/V) methyl alcohol in benzene, dried in a vacuum over at 100°C for 8 hours, allowed to cool in a desiccator, and then weighed.

Core permeabilities were measured in a conventional permeameter utilizing a Hassler assembly. Fluids were displaced from the reservoirs into the core with dry, pressurized nitrogen gas. The following procedure was utilized:
1. Core permeability to water was established by measuring flow rate at a known pressure.
2. A volume of 3M HCl was injected to remove formation carbonates.
3. Core permeability to water was re-established by again measuring flow rate at a known pressure.
4. A volume of above-described mixed acid solution in the presence and absence of the polymeric retardant was injected.
5. The mud acid was displaced from the core with water at 100 psig.
6. Core permeability to water was again established as before.
7. Steps 3–6 were repeated several times.

FIG. 1 which follows depicts the increase in permeability to water of two near identical Berea sandstone cores due to matrix dissolution by the acid systems. One was treated with a solution of 6 percent by weight of hydrofluoric acid and 12 percent by weight of hydrochloric acid and the second treated with a solution of 6 percent by weight of hydrofluoric acid, 12 percent by weight of hydrochloric acid and 1 percent by weight of polyvinylpyrrolidone (M.W. 360,000). In these experiments, both the volume of the acid system passed through the cores and the time of its exposure to the core were held constant. Thus, the permeability increase to water measured after each sequential treatment with each acid system is a measure of the quantity of matrix dissolved during the exposure time: The greater the permeability the greater quantity of matrix dissolved by the acid system. Therefore, the ability of the PVP to retard the reaction rate of the mud acid formulation upon the formation matrix and hence retard the rate of increase of permeability is shown in this figure. For example, after three equal exposure times to the respective acid systems (see A and A') the permeability of the Berea Sandstone core treated with the improved acidizing system is about 450 md (i.e., millidarcies) (A), while that of the uninhibited system is about 1200 md (A'). Similarly, after six equal exposure times (see B and B') the permeabilities are about 1000 md (B) and 2100 md (B') respectively.

C. Glass Slide Etching Measurements

A glass slide etching test was used to measure the rate of reaction between HF-HCl mixtures (with and without polyvinylpyrrolidone) and silica. The acid mixture was transferred volumetrically to a plastic jar, a weighed glass slide added to the acid, the jar sealed and reaction between mud acid and slide was allowed to proceed at room temperature for a predetermined period of time. Then the glass slide was removed from the jar, rinsed, dried and weighed. The extent of reaction was determined by weight loss of the slide.

FIG. 2 which follows shows the diminution in reaction rate of mud acid (i.e., the mixed acid solution) upon silica surfaces effected by solubilization of 5 percent by weight of polyvinylpyrrolidone (M.W. 360,000) into the acid. For example, after four hours exposure about 36 percent less etching has occurred in the acid system containing 5 percent polyvinylpyrrolidone, compared to the uninhibited acid system itself.

EXAMPLE I

A well drilled in a tight Berea sandstone formation which had been damaged by mud permeating the pore spaces of the borehole is treated with an aqueous acid polymer composition of this invention in order to stimulate oil production. In preparing to treat the producing formation of the well a packer is set at 6,150 feet above perforations located in the interval 6205-6210 feet. A solution of 1 percent by weight polyvinylpyrrolidone having a molecular weight of 360,000 and an intrinsic viscosity of 1.61 is prepared by dissolving completely 500 pounds of the polymer in 6000 gallons of 15 percent by weigh hydrochloric acid and 4 percent by weight of hydrofluoric acid using cyclic turbulent circulation. A conventional corrosion inhibitor and non-emulsifying agent are added to the acid solution.

In the first part of the stimulation operation, a pad of 2,000 gallons of fresh water containing 20 gallons of a scale inhibitor initially to prevent post-precipitation of salts dissolved in the subsequent acidizing process and to displace the calcium-containing connate water is pumped into the formation. In the next step, 1,000 gallons of conventional 15 percent HCl is pumped into the formation to remove $CaCO_3$ scale in the vicinity of the wellbore and to dissolve any traces of $CaCO_3$ in the matrix. In the third step, 4,000 gallons of the acidizing mixture previously described is pumped into the formation. Finally, the aqueous acidic polymer solution is displaced into the formation by pumping an additional 16,000 gallons of fresh water into it. The well is shut in 2 days after treatment and at the end of that time the production is measured and found to be substantially greater than production before the treatment.

What is claimed is:

1. A method of increasing the production of fluids from a subterranean fluid bearing formation having present therein sandstone and clay components comprising injecting down the wellbore penetrating said formation and injecting therefrom into said formation under a pressure greater than the formation pressure an aqueous well acidizing composition comprising an aqueous solution of from 5 to about 12 percent by weight of a mineral acid selected from the group consisting of hydrochloric and sulfuric acid, from about 3 to about 7 percent by weight of hydrofluoric acid and having dissolved therein from about 0.5 to about 5 percent by weight of a vinylpyrrolidone polymer, maintaining said composition in contact with the formation for a time sufficient for the acid to chemically react with the acid-soluble components of the formation to etch passageways therethrough thereby increasing substantially the flow capacity of the said subterranean formation.

2. The method of claim 1, wherein the said formation is a hydrocarbon-bearing formation.

3. The method of claim 1, wherein the said composition is injected down the wellbore penetrating said formation under a pressure greater than the formation pressure and sufficient to create fractures in the formation.

4. The method of claim 1, wherein the said composition is injected down the wellbore penetrating said formation under a pressure greater than the formation pressure but less than the pressure required to create fractures in the formation.

5. A method of increasing the production of fluids from a subterranean fluid bearing formation having present therein sandstone and clay components comprising injecting therefrom into said formation under a pressure greater than the formation pressure an aqueous well acidizing composition comprising an aqueous solution of from about 5 to about 12 percent by weight of a mineral acid selected from the group consisting of hydrochloric and sulfuric acid, from about 3 to about 7 percent by weight of hydrofluoric acid and having dissolved therein from about 0.5 to about 5 percent by weight of a vinylpyrrolidone polymer comprising recurring units of the formula:

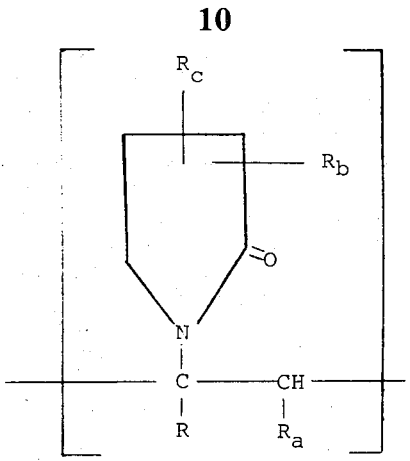

wherein R, $R_a$, $R_b$ and $R_c$ are independently selected from the group consisting of hydrogen and alkyl radicals having from 1 to 5 inclusive carbon atoms, maintaining said composition in contact with the formation for a time sufficient for the acid to chemically react with the acid-soluble components of the formation to etch passageways therethrough thereby increasing substantially the flow capacity of the said subterranean formation.

6. A method of increasing the production of fluids from a subterranean fluid-bearing formation having present therein sandstone and clay components comprising injecting down the wellbore penetrating said formation and injecting therefrom into said formation under a pressure greater than the formation pressure an aqueous acidizing composition comprising an acid aqueous solution formed by adding to an aqueous solution of about 10 to about 18 weight percent of a mineral acid selected from the group consisting of hydrochloric and sulfuric acid from about 0.5 to about 10 percent by weight of a fluorine-containing salt selected from the group consisting of (A) fluorides of the formula:

MF, wherein M is selected from the group consisting of $NH_4^+$ and $Li^+$ and (B) acid fluorides of the formula:

$MHF_2$ wherein M has the same meaning as described above, and having dissolved therein from about 0.5 to about 5 percent by weight of a vinylpyrrolidone polymer having an average molecular weight of about 10,000 to about 1,000,000 and comprising recurring units of the formula:

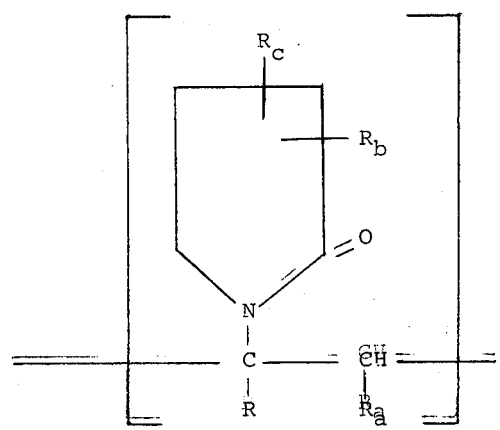

wherein R, $R_a$, $R_b$ and $R_c$ are independently selected from the group consisting of hydrogen and alkyl radicals having 1 to 5 inclusive carbon atoms, maintaining said composition in contact with the formation for a time sufficient for the acid to chemically react with the acid-soluble components of the formation to etch passageways therethrough thereby increasing substantially the flow capacity of the said subterranean formation.

7. The method of claim 6 wherein prior to injecting the said composition into the formation, the formation is pre-flushed with hydrochloric acid having a concentration of about 1 to about 5 weight percent.

8. The method of claim 6 wherein prior to injecting the said composition into the formation, the formation is preflushed with fresh water.

9. The method of claim 6 wherein in the composition employed the fluorine-containing salt is a fluoride of the formula:

MF, wherein M is selected from the group consisting of $NH_4^+$ and $Li^+$.

10. The method of claim 6 wherein in the composition employed the fluorine-containing salt is ammonium fluoride.

11. The method of claim 6 wherein prior to injecting the composition a slug of an aqueous composition containing from about 2.5 to about 10 weight percent of a fluorine containing salt selected from the group consisting of (A) fluorides of the formula:

MF, wherein M is selected from the group consisting of $NH_4^+$ and $Li^+$ and (B) acid fluorides of the formula:

$MHF_2$, wherein M has the same meaning as described above.

12. The method of increasing the production of fluids from a subterranean fluid-bearing formation having present therein sandstone and clay components comprising injecting down the wellbore penetrating said formation and injecting therefrom into said formation under a pressure greater than the formation pressure an aqueous acidizing composition comprising an acid aqueous solution formed by adding to an aqueous solution of about 10 to about 18 weight percent of a mineral acid selected from the group consisting of hydrochloric and sulfuric acid and having dissolved therein, from about 0.5 to about 10 percent by weight of a fluorine-containing salt selected from the group consisting of (A) fluorides of the formula:

MF, wherein M is selected from the group consisting of $NH_4^+$ and $Li^+$ and (B) acid fluorides of the formula:

$MHF_2$ wherein M has the same meaning as described above, and having dissolved therein from about 0.5 to about 5 percent by weight of a vinylpyrrolidone polymer having an average molecular weight of about 10,000 to about 1,000,000 and comprising recurring units of the formula:

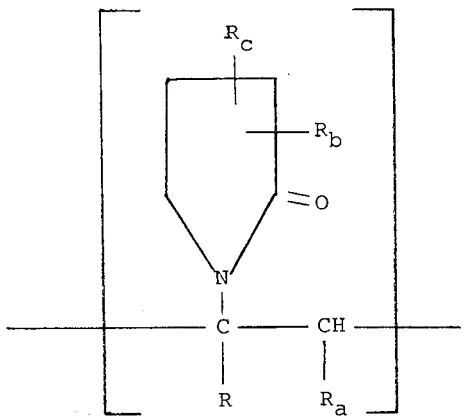

wherein R, $R_a$, $R_b$ and $R_c$ are independently selected from the group consisting of hydrogen and alkyl radicals having from 1 to 5 inclusive carbon atoms, maintaining said composition in contact with the formation for a time sufficient for the acid to chemically react with the acid-soluble components of the formation to etch passageways therethrough thereby increasing substantially the flow capacity of the said subterranean formation.

* * * * *